(12) United States Patent
Kaye

(10) Patent No.: US 6,672,508 B2
(45) Date of Patent: Jan. 6, 2004

(54) PHOTOGRAPHIC PROCESSING SYSTEM

(75) Inventor: Anthony L. Kaye, Stanmore (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/151,740

(22) Filed: May 20, 2002

(65) Prior Publication Data

US 2002/0179714 A1 Dec. 5, 2002

(30) Foreign Application Priority Data

May 30, 2001 (GB) .............................................. 0113026

(51) Int. Cl.$^7$ ................................................. G06K 7/10
(52) U.S. Cl. ............................. 235/462.01; 235/462.05
(58) Field of Search ..................... 235/462.01, 462.05; 396/207, 6

(56) References Cited

U.S. PATENT DOCUMENTS

| | | | | |
|---|---|---|---|---|
| 4,123,767 A | * | 10/1978 | Halpern | ....................... 396/317 |
| 4,962,403 A | | 10/1990 | Goodwin et al. | |
| 5,109,241 A | * | 4/1992 | Keeney | ....................... 396/207 |
| 5,118,183 A | * | 6/1992 | Cargill et al. | .................. 356/73 |
| 5,119,126 A | | 6/1992 | Tokuda | |
| 5,352,879 A | | 10/1994 | Milch | |
| 5,831,714 A | * | 11/1998 | Yoshikawa | .................... 355/40 |
| 6,173,119 B1 | * | 1/2001 | Manico et al. | ................. 396/6 |
| 6,206,287 B1 | * | 3/2001 | Wasula et al. | ......... 235/462.05 |
| 6,215,544 B1 | * | 4/2001 | Beauviala et al. | ............ 352/72 |
| 6,278,483 B1 | * | 8/2001 | Sartor | ......................... 348/96 |
| 6,323,934 B1 | * | 11/2001 | Enomoto | ..................... 355/40 |
| 6,349,171 B1 | * | 2/2002 | Koike | ........................... 396/6 |
| 6,353,713 B1 | * | 3/2002 | Takahashi et al. | .......... 396/315 |
| 6,374,057 B1 | * | 4/2002 | Hayakawa | ................... 396/315 |
| 6,381,416 B2 | * | 4/2002 | Manico et al. | .............. 396/207 |

FOREIGN PATENT DOCUMENTS

| | | |
|---|---|---|
| EP | 0 595 032 B1 | 7/1997 |
| JP | 11-231465 | 8/1999 |

\* cited by examiner

Primary Examiner—Thien M. Le
Assistant Examiner—Allyson Sanders
(74) Attorney, Agent, or Firm—Milton S. Sales

(57) ABSTRACT

The invention provides a processing system, comprising a detector to detect a unitary barcode on a film, the barcode identifying the film and a camera, thereby identifying a film/camera combination; and a memory to store a plurality of processing algorithms, one or more of the processing algorithms corresponding to a particular film/camera combination and being optimized in relation to one or more of the parameters of the respective film/camera combination; and a selector to select the corresponding processing algorithm on identification of the film/camera combination, to process optimally the film. The invention provides a system in which the use of custom designed algorithms specifically optimized for the film/camera or even film/camera-lens combination and the usage pattern of OTUCs, enables optimization of output images from the film to be obtained.

17 Claims, 3 Drawing Sheets

PHOTOGRAPHIC PROCESSING SYSTEM

This is a U.S. Original Patent Application which claims priority on United Kingdom Patent Application No. 0113026.9 filed May 30, 2001.

FIELD OF THE INVENTION

The present invention relates to a camera and a photographic processing system. The invention also relates to a photographic film for processing by the processing system and for use with the camera. The invention relates to a photographic processing system capable of optimizing the quality of the images it produces. The invention relates particularly to a one-time use camera (OTUC) and a photographic film for the OTUC.

BACKGROUND OF THE INVENTION

Photographic films are assigned a unique code, referred to as DX Part 1 and Part 2 codes, by the Photographic and Imaging Manufacturers Association (PIMA). For example, currently available 35 mm films and Advanced Photographic System films (APS) each have an associated DX Part 1 and Part 2 code. The codes are latent image barcodes (LIBCs) arranged at positions along the edge of the film. When the films are processed, the latent images become visible on the film negative and are read by printing and/or scanning equipment. The barcodes are used to select adjustments that are made to the colour balance and density (lightness/darkness) settings of scanners and printers to optimize the final results.

The optimization involves changing user adjustable parameters within a stored processing algorithm in the printing and/or scanning equipment. However, this process has limitations when applied to OTUCs, and other film/camera combinations where the parameters, such as design parameters or usage, are known. The use of the same processing algorithm for the production of images from films obtained from different cameras or for ranges of pictures taken in situations where different environmental factors occur, provides for sub-optimum results.

To improve the quality of the results, the processing algorithm must correspond to the populations of negatives developed from film taken with each specific camera type. The populations of negatives may be unique to such a film/camera combination. The populations of negatives from OTUCs differ from those obtained from traditional cameras due to the OTUCs' design parameters and the actual film used. In OTUCs, (as with other film/camera combinations where the design parameters are known) the design parameters, which include amongst others, lens and flash characteristics, may be specific to a particular camera model and thereby define a specific camera type and a unique film/camera combination.

There is variation between the population of negatives developed from film taken with different models of OTUC. In addition, the usage of the OTUC i.e. the range of pictures taken by users with OTUCs can also have an effect on the populations of negatives. Examples of features that may effect the populations include distance between camera and object or light-level parameters of consumer pictures taken with an OTUC. Furthermore, underwater OTUCs can also produce negatives with specific populations.

The current generation of Kodak consumer 800-speed film has had two DX Part 1 and Part 2 numbers assigned to it by PIMA, depending upon usage. The film has a DX Code of 43-1 when packed for use as conventional 35 mm film and a DX Code of 43-2 when packed into OTUCs. This enables the separation of films exposed by OTUCs from those exposed by conventional cameras and the application of different colour balance and density (lightness/darkness) settings. The application of different colour balance and density settings is within the constraints of a single processing algorithm, which is designed for a broad range of negatives and not for any specific negative populations.

To address this, systems have been developed that rely on the use of an additional barcode printed on the film. An example of such a system is disclosed in Japanese Patent Application Kōkai Publication number 11-231465 in the name of the Fuji Photo Film Co., Ltd. This document discloses a system, in which an additional barcode serves to encode information about the picture-taking unit (OTUC or unique film/camera combination), used to expose the film. A problem with this system is that modification of the scanning and/or printing equipment is required to enable the additional barcode to be read. This is costly and requires re-design of the system hardware.

Problem to be Solved by the Invention

A system is required that overcomes the problems discussed above.

A system is also required which enables optimization of the quality of images to be obtained. In particular, a system is required that enables optimization of the quality of images with respect to the film/camera combination used to obtain the images. As explained above this problem is particularly noticeable in relation to OTUCs.

SUMMARY OF THE INVENTION

According to a first aspect of the present invention, there is provided a photographic processing system, comprising: a detector to detect a unitary barcode on a film, the barcode identifying the film and a camera, thereby identifying a film/camera combination; and a memory to store a plurality of processing algorithms one or more of the processing algorithms corresponding to a particular film/camera combination and being optimized in relation to one or more of the parameters of the respective film/camera combination; and a selector to select the corresponding processing algorithm on identification of the film/camera combination, to process optimally the film.

Preferably, the barcode is an industry standard barcode such as the DX code.

Preferably, the camera is a one-time use camera.

According to a second aspect of the present invention, there is provided a film for use with the system of the first aspect of the present invention, on which is recorded a unitary barcode to identify a film/camera combination, the barcode including information identifying a film with reference to one or more of the parameters thereof and a camera with reference to one or more of the parameters thereof.

According to a third aspect of the present invention, there is provided a method of processing a photographic film, wherein the film is a film according to the second aspect of the present invention, comprising the steps of: from the barcode on the film, identifying a film/camera combination; and automatically selecting a processing algorithm optimized in relation to one or more of the parameters of said identified film/camera combination.

Preferably, the parameters of the film/camera combination in relation to which the algorithm is optimized include one or more of film characteristics, lens characteristics of the camera, flash characteristics of the camera and usage pattern of the camera.

Preferably, the method further comprises, once the optimized processing algorithm has been selected, the step of generating images from said film using said selected algorithm.

According to a fourth aspect of the present invention, there is provided a one-time use camera having a film according to the second aspect of the present invention.

Advantageous Effect of the Invention

The first aspect of the present invention provides a film processing system that enables a suitable algorithm to be used in the development of a photographic film, the algorithm being particularly suited to the film/camera combination with which pictures were taken.

To achieve maximum print quality, or scanned image file quality from images captured by one time use cameras (OTUC) cameras or unique film/camera combinations, different image processing algorithms are required from those used with films exposed in conventional cameras. In one example, the barcode used is the industry standard DX code. By using the unique industry standard DX Part 1 and Part 2 numbers that are assigned by Photographic and Imaging Manufacturers Association, Inc. in line segregation at printing and scanning may be performed. This allows scanning and/or printing equipment to distinguish whether images exposed onto the same type of film are from conventional cameras or from a particular model of OTUC, and then select an appropriate custom designed algorithm, to maximize quality.

Without the use of custom designed algorithms specifically optimized for the film/camera or even film/camera-lens combination and/or the usage pattern of OTUCs, full optimization and the maximizing of quality cannot be achieved. The present invention extends significantly the degree of optimization previously possible and increases the magnitude of the quality gains that may be obtained.

In addition, in contrast to conventional systems that rely on the use of additional barcodes to communicate meta-data to a printer or scanner the present invention requires no hardware modifications to the scanning and/or printing equipment. The benefits can be obtained via software upgrades to the scanning and/or printing equipment.

Another aspect of the present invention provides a film having a unique barcode which enables identification of the film/camera combination in which the film was used. This in turn enables the simple selection of an optimized processing algorithm, ensuring that images of optimum quality are produced.

BRIEF DESCRIPTION OF THE DRAWINGS

Examples of the present invention will now be described in detail with reference to the accompanying drawings, in which.

DETAILED DESCRIPTION OF THE INVENTION

Figure 1:
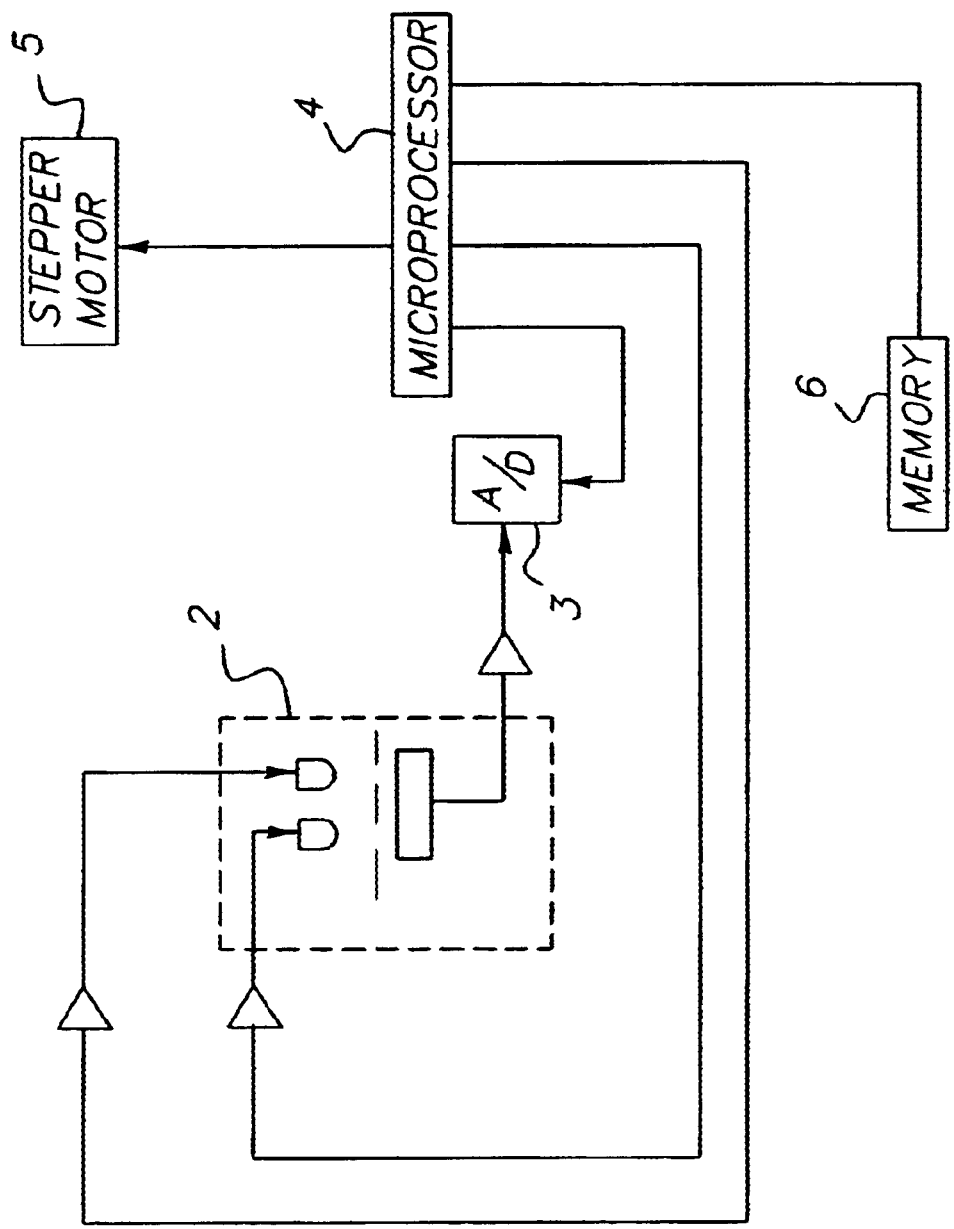
FIG. 1 shows a schematic representation of an example of a film scanning and/or printing system according to the present invention.

FIG. 1 shows a schematic representation of an example of a film processing system according to the present invention. The processing system includes a scanning and/or printing system (photofinishing system) to receive a film and produces images (e.g., photographs) from an associated printer or scanner. The scanning and/or printing system is shown with a barcode reader 2, similar to that disclosed in U.S. Pat. No. 5,352,879 in the name of Eastman Kodak Company, where its operation is described fully. It will be appreciated that any suitable barcode reader may be used in the film processing system of the present invention and that the present invention is not limited to the device disclosed in the referenced U.S. Patent. The barcode reader has a reading unit 2 to read a barcode on a film (not shown) being processed. A microprocessor 4 is arranged to receive an output from the reading unit 2 via an analogue-to-digital converter 3 and determine the unitary barcode, in this example the industry standard DX code, of the film. In addition, a memory 6 is provided, coupled to the microprocessor 4. The film is driven through the reading unit 2 by a stepper motor 5 under the control of the microprocessor 4. In this example, the memory 6 is arranged to store a number of predetermined processing algorithms.

In use, a film passes through the reading unit 2 and its DX code is read. The microprocessor 4, acting in this case as a selector, then selects an appropriate processing algorithm from the memory 6, which is used to produce the images from the printer or scanner (not shown), such as digital image files, hard copy (e.g., photographs) or soft copy (e.g., computer displayed images). The algorithm selected is a customized algorithm, the customization being dependent on the unique film/camera combination with which the photographs were taken.

Figure 2:
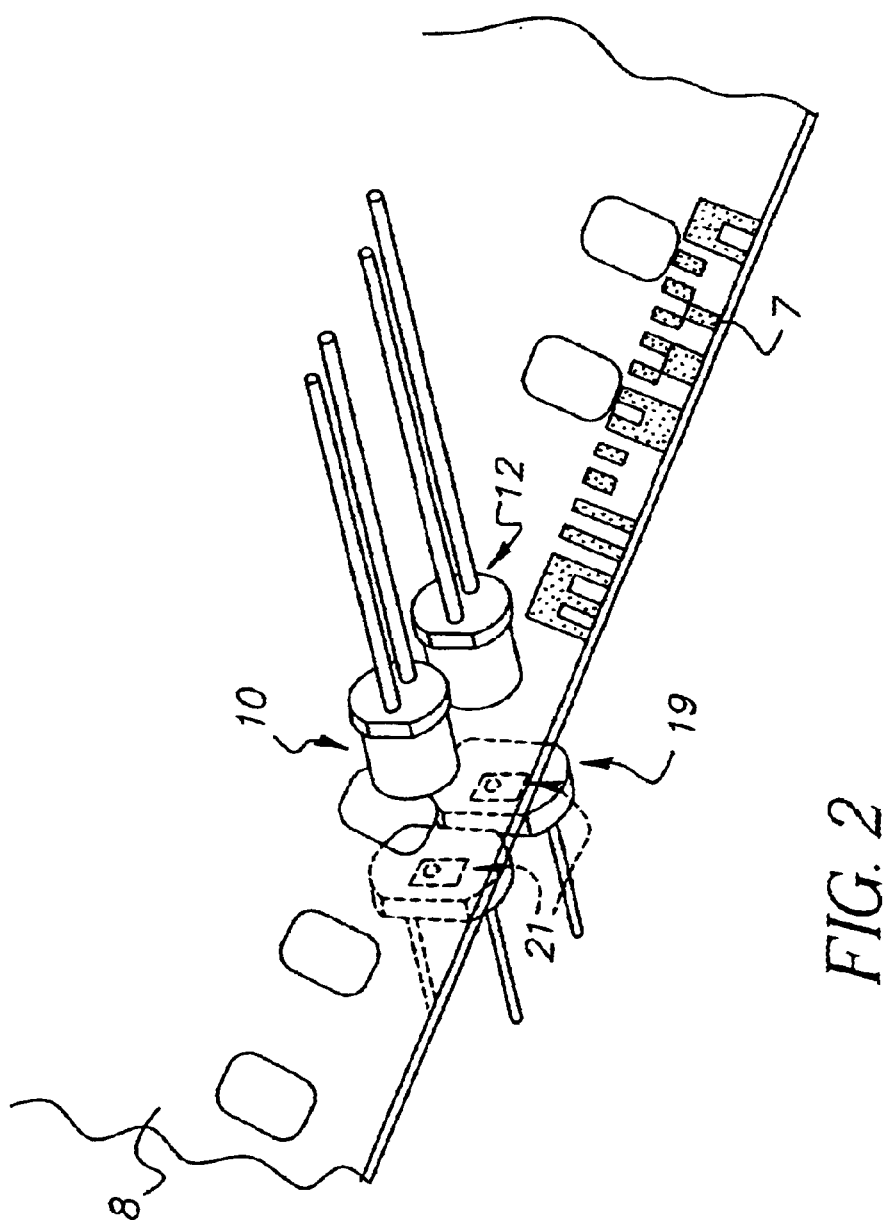
FIG. 2 shows an example of a film encoded according to the present invention.

FIG. 2 shows an example of a film 8 encoded according to the present invention. The film has a barcode 10 printed on one of its edges, which is used to encode information about the specific camera type in which the film was used. For example, manufacturers who make a certain model of one-time use camera can apply a unique code to the film used inside such cameras. As mentioned above, that camera will produce films having a unique negative population. To optimize the quality of prints generated from the film, it is necessary to use a suitable algorithm in the scanning and/or printing process. The film manufacturer provides a suitable algorithm to the scanning and/or printing system so that when the film is scanned and/or printed, an appropriate algorithm is used in the generation of the images. The algorithm is optimized in relation to one or more of a number of possible parameters. These include, amongst others, film characteristics such as sensitometric or colour-reproduction characteristics. Alternatively or in addition, the algorithm is optimized in relation to camera characteristics such as lens or flash characteristics.

If the film/camera combination identified is a particular one for which there is a corresponding algorithm, then this corresponding algorithm is used in the processing. Otherwise, if no customized algorithm is provided for a particular film/camera combination, a suitable global processing algorithm is used.

Referring to FIG. 2, the film 8 has a barcode 10 printed along one of its edges. As the film progresses through the scanning and/or printing equipment, detectors 12 read the barcode 10 and provide a signal to the microprocessor 4 (not shown in FIG. 2) so that a corresponding algorithm can be selected.

For OTUC or film/camera combinations that would benefit from unique printer/scanning processing algorithms, unique DX Part 1 and Part 2 numbers are applied to the film. This is done using the existing industry-standard DX latent image barcode and therefore negates the need for any additional hardware or hardware modifications to the scanning and/or printing system. The scanning and/or printing system is arranged to read the barcode as it already does and assign a custom designed algorithm in dependence on the film/camera combination. This may be dependent on the specific camera type or picture-taking unit in which the film was used. This is a significant advantage that facilitates easy industry wide adoption. In contrast, the system described in the Japanese Patent Application, Kōkai Publication #11-231465, referenced above, requires modification to the scanning and/or printing system which is undesirable.

During scanning and printing stages, the processing system of the present invention, having read the barcode on the film, allocates an appropriate algorithm to process the image data. As explained above, if the film/camera combination identified is a particular one for which there is a corresponding algorithm, then this corresponding algorithm is used in the processing. Otherwise, a suitable global processing algorithm is used.

This is in contrast to conventional systems, which only allow optimisation of colour and density (lightness/darkness) parameters within the constraints of an existing algorithm. The present invention allows the selection of unique algorithms whose parameters are optimized to maximize the quality of images obtained from a known OTUC or film/camera combination.

As discussed above, the negative population produced by OTUCs differs from that produced by the same film used in traditional cameras e.g., a film/camera combination of which the design parameters are known. In addition, there is also variation in the negative population produced by different OTUCs. These differences are due to design and usage factors, such as, for example, the lens characteristics of the OTUC or the brightness of the location in which the film was used.

To obtain optimum results a custom designed algorithm is required for each of these situations and these factors are preferably allowed for in the design of the algorithms. As explained above, the algorithm is designed to allow for many factors, including but not limited to, film characteristics, lens characteristics (e.g., $Cos^4$ fall off), flash characteristics (e.g., colour temperature, fall off) and usage (e.g., distance/light level parameters of consumer pictures, underwater usage etc.). The algorithms are designed in accordance with design principles and methods known in the art (see for example, European Patent Application No. EP 0 595 032A).

The algorithm may be optimized in dependence on physical parameters of the camera, such as those mentioned above, or it may be optimized in dependence on camera usage. For example, if the camera is an underwater OTUC, some adjustment to the processing algorithm is required to ensure optimum quality of the images produced.

When a new film type is made, DX Part 1 and Part 2 codes are assigned, and a unique custom-designed algorithm is required. The film or camera manufacturer usually generates the algorithm since it is aware of the necessary design features thereof. It is an advantage of the system of the present invention that since it is only a new algorithm that is needed, this can be implemented with an updating of the memory coupled to the microprocessor. This can be achieved simply by downloading the algorithm from an appropriate web site, e.g., a web site of the printer/scanner manufacturer. Alternatively the software may be distributed via an appropriate media, e.g., CD-ROM.

In addition to the algorithm being designed to compensate for parameters of the OTUC, in another embodiment of the present invention, the DX barcode is used to select a processing algorithm that adapts the image in some predetermined manner. The OTUC may be provided with a lens producing known geometric distortions. An algorithm is then selected so that the system compensates for the geometric distortions. For example, if the geometric distortions were due to the use of an anamorphic lens, in response to recognition of the barcode, the scanning and/or printing equipment expands the image so that it corresponds to the view seen by a user at the time the picture was taken. This is achieved without any hardware modification in the scanning and/or printing equipment since it is programmed to read the barcode and assign a custom designed algorithm in dependence thereon. In this case, it is possible to produce a wide-angle OTUC utilising the whole of a 35 mm frame resulting in enhanced quality.

Figure 3:
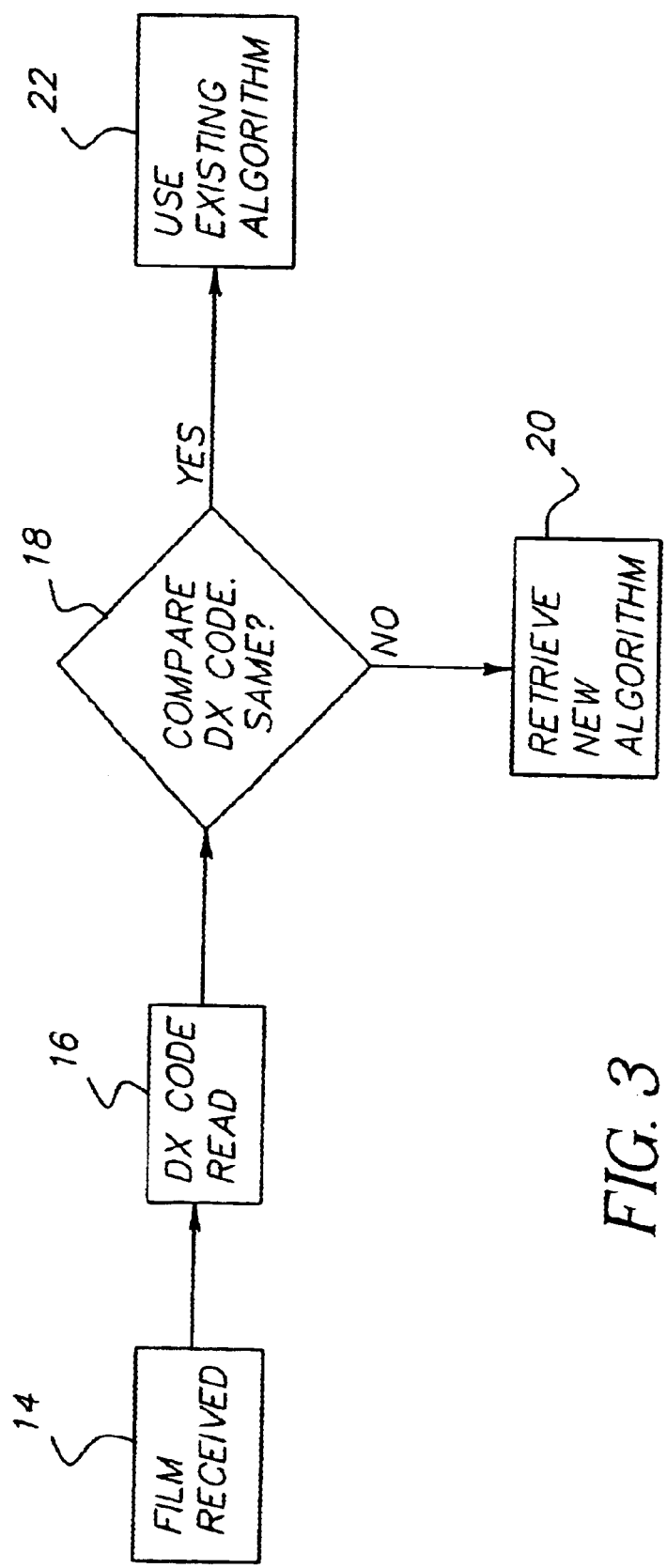
FIG. 3 shows a flow chart of the process during the development of a film according to the present invention.

FIG. 3 is a flow chart showing the main steps in the method of the present invention. At step 14, the film is received into the scanning and/or printing equipment. The method then proceeds to step 16 in which the DX code of the film is determined from the barcode printed on the edge of the film negative, as discussed above. Then, at step 18 it is determined whether the DX code of the film currently being scanned and/or printed is the same as or different to that of the previously developed film. If it is determined that the DX code is the same as the previously developed film i.e. the film currently being processed originates from an identical (or sufficiently similar) picture taking unit, then the last algorithm used by the scanning and/or printing system is re-used. If however, it is determined that the DX code is different and therefore the current film originates from a different type of picture taking unit, a new algorithm is retrieved from the system memory and used to generate output images. The algorithm selection occurs automatically as the DX code of the film is read by the scanning and/or printing system and thus, the quality of the final photographs is automatically optimized.

What is claimed is:

1. A photographic processing system, comprising:
   a detector to detect a unitary barcode on a film, the barcode identifying the film and a camera, thereby identifying a film/camera combination;
   a memory to store a plurality of processing algorithms one or more of the processing algorithms corresponding to a particular film/camera combination and being optimized in relation to flash characteristics of the camera and usage pattern of the camera; and,
   a selector to select the corresponding processing algorithm on identification of the film/camera combination, to process optimally the film.

2. A system according to claim 1, in which the unitary barcode is a DX barcode.

3. A film for use with the system of claim 1, on which is recorded a unitary barcode to identify a film/camera combination, the barcode including information identifying a film with reference to one or more of the parameters thereof and a camera with reference to one or more of the parameters thereof, the parameters of the camera being selected from the group consisting of flash characteristics of the camera and usage pattern of the camera.

4. A film according to claim 3, in which the parameters of the film are selected from the group consisting of sensitometric characteristics or color-reproduction characteristics.

5. A film according to claim 3, in which the unitary barcode is a DX barcode.

6. A method of processing a photographic film, wherein the film is a film according to claim 3, comprising the steps of:

from the barcode on the film, identifying a film/camera combination; and automatically selecting a processing algorithm optimized in relation to one or more of the parameters of said identified film/camera combination, the parameters including the flash characteristics of the camera and usage pattern of the camera.

7. A method of processing a photographic film, wherein the film is a film according to claim 5, comprising the steps of:

from the barcode on the film, identifying a film/camera combination; and automatically selecting a processing algorithm optimized in relation to one or more of the parameters of said identified film/camera combination, the parameters including the flash characteristics of the camera and usage pattern of the camera.

8. A method according to claim 6, further comprising, once the optimized processing algorithm has been selected, the step of generating images from said film using said selected algorithm.

9. A method according to claim 8, in which the images comprise hard copy, soft copy or digital image files.

10. A method according to claim 6, in which the algorithm is selected in dependence on the camera specification.

11. A method according to claims 6, in which the algorithm is selected in dependence on the camera specification and performance.

12. A method according to claim 6, in which the algorithm is selected in dependence on the camera usage.

13. A method according to claim 6, in which the film/camera combination includes a one-time use camera having known parameters and film adapted for use in said camera.

14. A one-time use camera having a film according to claim 3.

15. A one-time use camera having a film according to claim 5.

16. A one-time use camera according to claim 14, having a lens configured to provide a predetermined geometric distortion to captured images, and a film having a unitary barcode including information to identify the camera as having a lens with said predetermined geometric distortion.

17. A one-time use camera according to claim 15, having a lens configured to provide a predetermined geometric distortion to captured images, and a film having a unitary barcode including information to identify the camera as having a lens with said predetermined geometric distortion.

* * * * *